(12) United States Patent
Lindholm et al.

(10) Patent No.: US 7,953,773 B2
(45) Date of Patent: May 31, 2011

(54) SYSTEM AND METHOD FOR DETERMINISTIC GARBAGE COLLECTION IN A VIRTUAL MACHINE ENVIRONMENT

(75) Inventors: David Lindholm, Stockholm (SE); Mattias Joelson, Sollentuna (SE); Noora Peura, Tullinge (SE)

(73) Assignee: Oracle International Corporation, Redwood Shores, CA (US)

( * ) Notice: Subject to any disclaimer, the term of this patent is extended or adjusted under 35 U.S.C. 154(b) by 286 days.

(21) Appl. No.: 11/182,137

(22) Filed: Jul. 15, 2005

(65) Prior Publication Data

US 2007/0016633 A1 Jan. 18, 2007

(51) Int. Cl.
*G06F 12/00* (2006.01)
*G06F 17/30* (2006.01)

(52) U.S. Cl. .................................. 707/817; 711/170
(58) Field of Classification Search .................. 707/206
See application file for complete search history.

(56) References Cited

U.S. PATENT DOCUMENTS

| | | | |
|---|---|---|---|
| 4,408,274 A * | 10/1983 | Wheatley et al. | 711/163 |
| 5,857,210 A * | 1/1999 | Tremblay et al. | 707/206 |
| 5,873,104 A | 2/1999 | Tremblay et al. | |
| 6,049,810 A * | 4/2000 | Schwartz et al. | 1/1 |
| 6,567,905 B2 * | 5/2003 | Otis | 711/170 |
| 6,839,725 B2 | 1/2005 | Agesen et al. | |
| 6,912,553 B1 * | 6/2005 | Kolodner et al. | 707/206 |
| 7,010,555 B2 * | 3/2006 | Blandy et al. | 1/1 |
| 7,069,280 B2 * | 6/2006 | Garthwaite | 707/206 |
| 7,263,700 B1 * | 8/2007 | Bacon et al. | 718/1 |
| 2004/0073764 A1 * | 4/2004 | Andreasson | 711/170 |
| 2004/0111448 A1 | 6/2004 | Garthwaite | |

OTHER PUBLICATIONS

Bjarne Steensgaard, "Thread-Specific Heaps for Multt-threaded Programs", ACM ISSM, 2000, p. 18-24.*
International Search Report dated Oct. 2, 2007, for International Application No. PCT/US06/03238, 2 pages.
Supplementary European Search Report dated Apr. 6, 2009, for European Patent Application No. 06719885.3, 11 pages.
European Office Action dated Aug. 5, 2009, for European Patent Application No. 06719885.3, 1 page.

(Continued)

*Primary Examiner* — Pierre M Vital
*Assistant Examiner* — Sabana Rahman
(74) *Attorney, Agent, or Firm* — Fliesler Meyer LLP (57) ABSTRACT

In a virtual machine, Java Virtual Machine, or other runtime environment, a system and a method for improving the garbage collection times of the virtual machine memory. The JVM, or a garbage collector operating therein, can estimate, for an area of the memory space, the sum of the pause times for garbage collection of the software objects within the area, and control the garbage collection process so that the sum of the pause times for garbage collection will be lower than a target pause time limit, with a high degree of probability. A preselected compaction area can be pre-compacted to keep the compaction time within the target limit. The garbage collector can also predict the time required for final marking and repeat precleaning until the predicted final marking time is within the limits for pause times, and can improve pause times by redirecting application worker threads to do garbage collector work when entering or leaving the memory subsystem.

29 Claims, 7 Drawing Sheets

OTHER PUBLICATIONS

Ossia, Y., et al. "A Parallel, Incremental and Concurrent GC for Servers," IBM Haifa Research Laboratory, Israel, Proceedings of the ACM SIGPLAN Conference on Programming Language Design and Implementation (PLDI), Berlin, Germany, Jun. 17-19, 2002, 12 pages.

Barabash, K., et al., "Mostly Concurrent Garbage Collection Revisited," IBM Haifa Research Laboratory, Israel, Proceedings of the ACM SIGPLAN Conference on Object-Oriented Programming, Systems, Languages, and Applications (OOPSLA), Anaheim, CA, USA, Oct. 26-30, 2003, 14 pages.

Endo, T., et al., "Reducing Pause Time of Conservative Collectors," Proceedings of the ACM SIGPLAN Conference on International Symposium on Memory Management (ISMM), Berlin, Germany, Jun. 20-21, 2002, 13 pages.

* cited by examiner

SYSTEM AND METHOD FOR DETERMINISTIC GARBAGE COLLECTION IN A VIRTUAL MACHINE ENVIRONMENT

FIELD OF THE INVENTION

The invention is generally related to virtual machine environments and other run-time environments, and particularly to a system and method for improving the garbage collection times of the virtual machine memory.

BACKGROUND

Virtual machines are abstract computers that allow for portability of software applications between different underlying computer architectures. Typically, the virtual machine (VM) is a complex software product that is implemented upon a particular computer hardware platform and/or operating system. The VM then provides a uniform layer of abstraction between the hardware platform and any compiled software applications that will run thereon. Virtual machines are essential for the portability of certain technologies, including Java. The Java Virtual Machine (JVM) allows compiled Java programs to be run on the JVM, independently of whatever hardware or operating system may be underneath. Examples of commercially available JVMs include the Sun Java Virtual Machine from Sun Microsystems, Inc., and the JRockit Virtual Machine from BEA Systems, Inc.

Virtual machines for languages such as Java, C#, Perl and Lisp include garbage collection features as part of the VM itself. Garbage collection allows the VM to reclaim unused computer memory during runtime, and is an important feature for the VM, since it relieves the programmer from much of the burden in providing for and managing memory cleanup within the software application itself. The basic concept of garbage collection is to find all of the data that is currently reachable from the software application, and then discard all other data. To release the memory used for a software object, the programmer only has to erase any pointer pointing to that object. The garbage collection logic or routines (also referred to as the garbage collector) will later detect that the object is no longer reachable, and will reclaim the memory.

Traditionally, in the Java environment, during garbage collection the garbage collector pauses the running JVM and performs the necessary work. This is referred to as the garbage collector pause time, or simply the pause time. The pause time can cause problems for the programmer since it is difficult when preparing application code to anticipate for random pauses. JVMs with unpredictable pause times cannot be used for applications with strict timing requirements, such as real-time systems for telecommunications, physical processes or warning systems. Applications with more relaxed requirements, such as interactive applications, can still seem to fail if they do not respond to the user within an expected time frame.

Much work has been done to improve the pause times for garbage collectors. For example, the pause time can be shortened by running the garbage collecting threads in parallel on multiple processors during the pause. The garbage collecting process can also be designed to be a generational one, in which case it is divided into a young collection (YC) phase that is performed often, and an old collection (OC) phase that is performed more seldom. Also, parts of the garbage collection process can be performed concurrently with the running software application, with short pauses to accommodate for changes performed by the running application.

As described above, the current techniques used for garbage collection are unsatisfactory in environments and software applications that require strict timing, such as telecommunications, warning systems, and other real-time systems. What is desirable is a garbage collection technique that can enable predictable and short pause times within a virtual machine.

SUMMARY OF THE INVENTION

Disclosed herein is a system and method for deterministic garbage collection in a virtual machine (VM), or other runtime environment, and particularly for use in a system that includes a Java Virtual Machine (JVM). As described above, current techniques used for garbage collection have unpredictable pause times, and are unsatisfactory in environments and software applications that require strict timing, such as telecommunications, warning systems, and other real-time systems. An embodiment of the present invention addresses this problem by providing a system and a method to garbage collect memory in such a way that the pause time, with a high degree of probability, lies below a target pause time. In accordance with an embodiment, the invention provides a system for deterministic garbage collection in a virtual machine environment, comprising: a virtual machine for executing a software application; a memory space for use by the virtual machine in storing software objects and pointers as part of the software application; and a garbage collector that estimates, for an area of the memory space, the sum of the pause times for garbage collection of the software objects within the area, and controls the garbage collection process so that the sum of the pause times for garbage collection will be lower than a target pause time limit. In accordance with another embodiment, the JVM can partially compact the preselected compaction area to keep the compaction time within the limits for pause times. In accordance with another embodiment, the JVM can predict the time required for final marking and repeat precleaning until the predicted final marking time is within the limits for pause times. In accordance with another embodiment, the JVM can improve pause times by redirecting application worker threads to do garbage collector work when entering or leaving the memory subsystem. Embodiments may also be combined to increase the probability for even shorter pause times.

DETAILED DESCRIPTION

Disclosed herein is a system and method for deterministic garbage collection in a virtual machine (VM), or other runtime environment, and particularly for use in a system that includes a Java Virtual Machine (JVM). As described above, current techniques used for garbage collection have unpredictable pause times, and are unsatisfactory in environments and software applications that require strict timing, such as telecommunications, warning systems, and other real-time systems. An embodiment of the present invention addresses this problem by providing a system and a method to garbage collect memory in such a way that the pause time, with a high degree of probability, lies below a target pause time. In accordance with an embodiment, the invention provides a system for deterministic garbage collection in a virtual machine environment, comprising: a virtual machine for executing a software application; a memory space for use by the virtual machine in storing software objects and pointers as part of the software application; and a garbage collector that estimates, for an area of the memory space, the sum of the pause times for garbage collection of the software objects within the area, and controls the garbage collection process so that the sum of the pause times for garbage collection will be lower than a target pause time limit. In accordance with another embodiment, the JVM can partially compact the preselected compaction area to keep the compaction time within the limits for pause times. In accordance with another embodiment, the JVM can predict the time required for final marking and repeat precleaning until the predicted final marking time is within the limits for pause times. In accordance with another embodiment, the JVM can improve pause times by redirecting application worker threads to do garbage collector work when entering or leaving the memory subsystem. Embodiments may also be combined to increase the probability for even shorter pause times. Experimental results have shown that the technique disclosed herein creates predictable and short pause times with an increase in fragmentation and memory usage, including in some instances keeping the pause times within the target pause time 99.99% of the time when the Java-heap does not contain more than 30% live objects.

Figure 1:
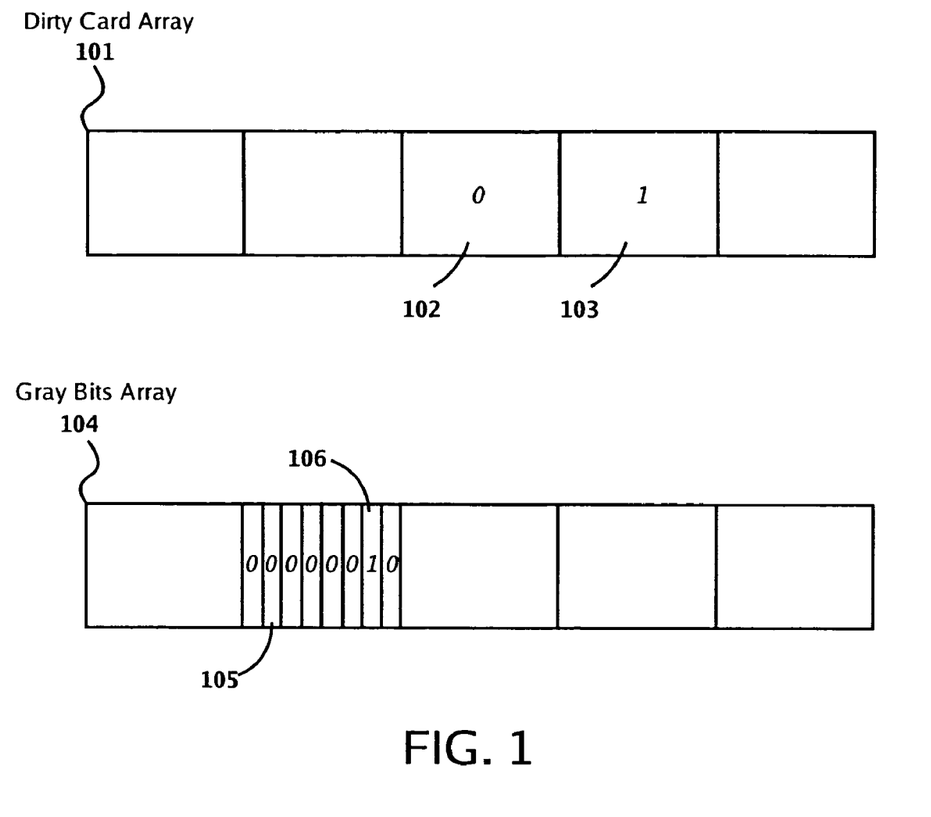
FIG. 1 shows a schematic of the data structures for dirty cards and gray bits in accordance with both a traditional non-generational concurrent garbage collector, and the present invention.

FIG. 1 shows a schematic of the data structures for dirty cards and gray bits in accordance with both a traditional non-generational concurrent garbage collector, and with embodiments of the present invention. As shown in FIG. 1, the dirty card array 101 is a byte array wherein each byte represents a small region of memory, typically a few hundred bytes. When the byte is a "zero" 102, then the card representing the region is clean. When the byte is any other value this means that the card is dirty 103. During runtime, a region becomes dirty when a worker thread (a thread that performs the actual work required by the user's application) updates a Java-object pointer within the region. The gray bits array 104 represents every possible location for a Java-object. To limit the number of gray bits a Java-object is always aligned on an 8-byte boundary. When a bit is a "zero" 105, there is no live object at that position. When a bit is a "one" 106, there is a live object at that position. Different objects take up different amounts of memory. The exact extent of the object in memory is found by examining the type of the object.

Figure 2:
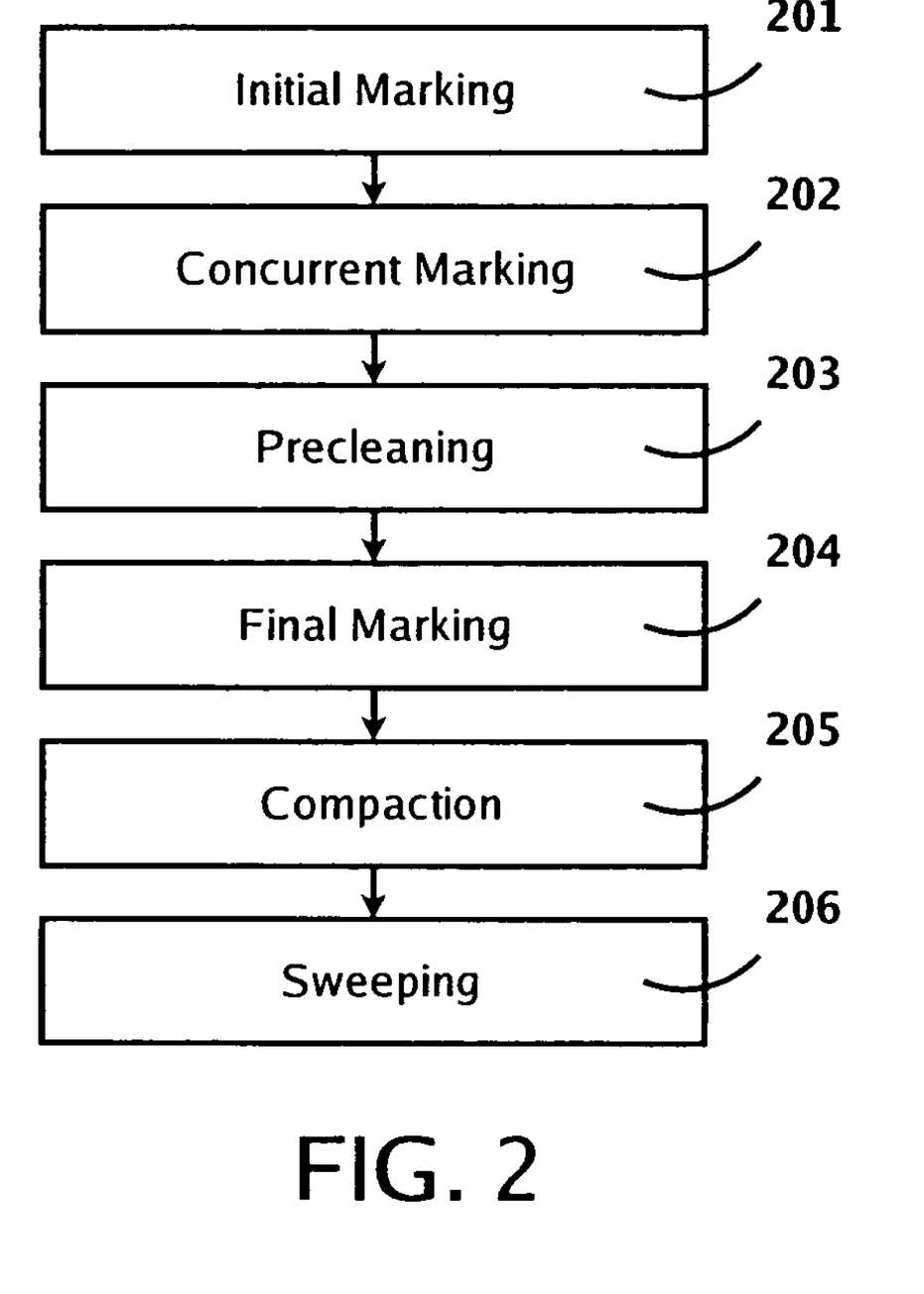
FIG. 2 shows a flowchart that illustrates the process used by a traditional non-generational concurrent garbage collector.

FIG. 2 shows a flowchart that illustrates the process used by a traditional non-generational concurrent garbage collector. In particular, FIG. 2 shows a flowchart that illustrates how the traditional non-generational concurrent garbage collector includes six steps or phases: an initial marking phase 201, concurrent marking phase 202, precleaning phase 203, final marking phase 204, compaction phase 205 and sweeping phase 206.

In step 201, the system sets up the data structures needed to perform garbage collecting which includes:

Selecting a compaction area in the heap. The compaction area should be small enough to enable fast processing, and large enough to keep down the fragmentation;

Setting up a compaction pointer location set. The compaction pointer location set stores all the pointer locations on the heap which contain pointers that point to objects within the selected compaction area. The compaction pointer location set is later traversed and the pointers are updated to reflect movements of objects within the compacted area; and Clearing the dirty card array 101. The clearing of the dirty card array takes some time, for example approximately 3 ms on a system with 1 Gb of Java-heap and a 1 GHz Intel Pentium processor. During the clearing, no worker threads are allowed to run. The gray bits have already been cleared at the end of the previous garbage collection.

In step 202, during the concurrent marking phase, the system traces all pointers from the roots (thread stacks and global data) to objects, and continues recursively with all pointers within these objects. Each time a new object is found the corresponding gray bit in the gray bit array 104 is checked and set. If it was already set, then the object has already been scanned and the concurrent marking thread can ignore it, otherwise it will recursively follow the pointers within the object. Since concurrent marking happens while the worker threads are running it is possible for a worker thread to update a pointer within a Java object that has already been scanned by the concurrent marking process. To remedy this, each time a worker thread updates a pointer, the card for the region of memory where the pointer is located, is marked as dirty. During the concurrent marking phase, every pointer is checked if it points into the selected compaction area. If it does point into the selected compaction area, then the pointer location is stored in a pointer location set for later retrieval during compaction.

In step 203, during the precleaning phase, the system restarts the concurrent marking process with only the pointers within the dirty cards as roots. During this process the worker threads can generate even more dirty cards, but more likely the number of dirty cards are reduced.

In step 204, the final marking phase is performed after precleaning. During this phase the worker threads are now paused so that the final marking can be performed and the last dirty cards are cleaned without any new cards being dirtied. At this point, the garbage collector now knows where all of the live objects are located on the Java-heap. In some instances, a situation may arise that some objects are believed to be live but, in fact, are not. This may happen if, for example, a Java-object pointer is zeroed but the object pointed to was scanned and marked before the zeroing. Such objects will be collected during the next garbage collection.

Sometimes there is a lot of free memory on the Java-heap but none can be used because the largest contiguous free block is smaller than the required allocation size. In step 205, a compaction phase is used to prevent fragmentation of the Java-heap in these instances. During the concurrent phase described above, all pointers to objects within the selected compaction area are stored. Therefore, since the pointer locations are already collected, it is possible to move the objects within the compaction area and to update all pointers to the moved objects without scanning the Java-heap again. The objects are moved inside the compaction area to eliminate free memory between the objects. The worker threads are stopped while this compaction is in progress.

In step 206, during the sweep phase the free areas of memory are gathered and linked together in free lists. Typically, one half of the memory space is swept while the other is in use by worker threads. The gray bits are set to zeros concurrently during this phase as well.

It will be noted that, as described above, when using a traditional non-generational concurrent garbage collector the initial marking step 201, the final marking step 203, and the compaction step 204 cannot be made concurrent. As a result, the time spent in these steps needs to be predictable and limited, if the system is to perform satisfactorily.

Deterministic Garbage Collection

An embodiment of the present invention provides a system and a method to garbage collect memory in a virtual machine environment in such a way that the pause times lie below a set target pause time, with a high degree of probability.

Figure 3:
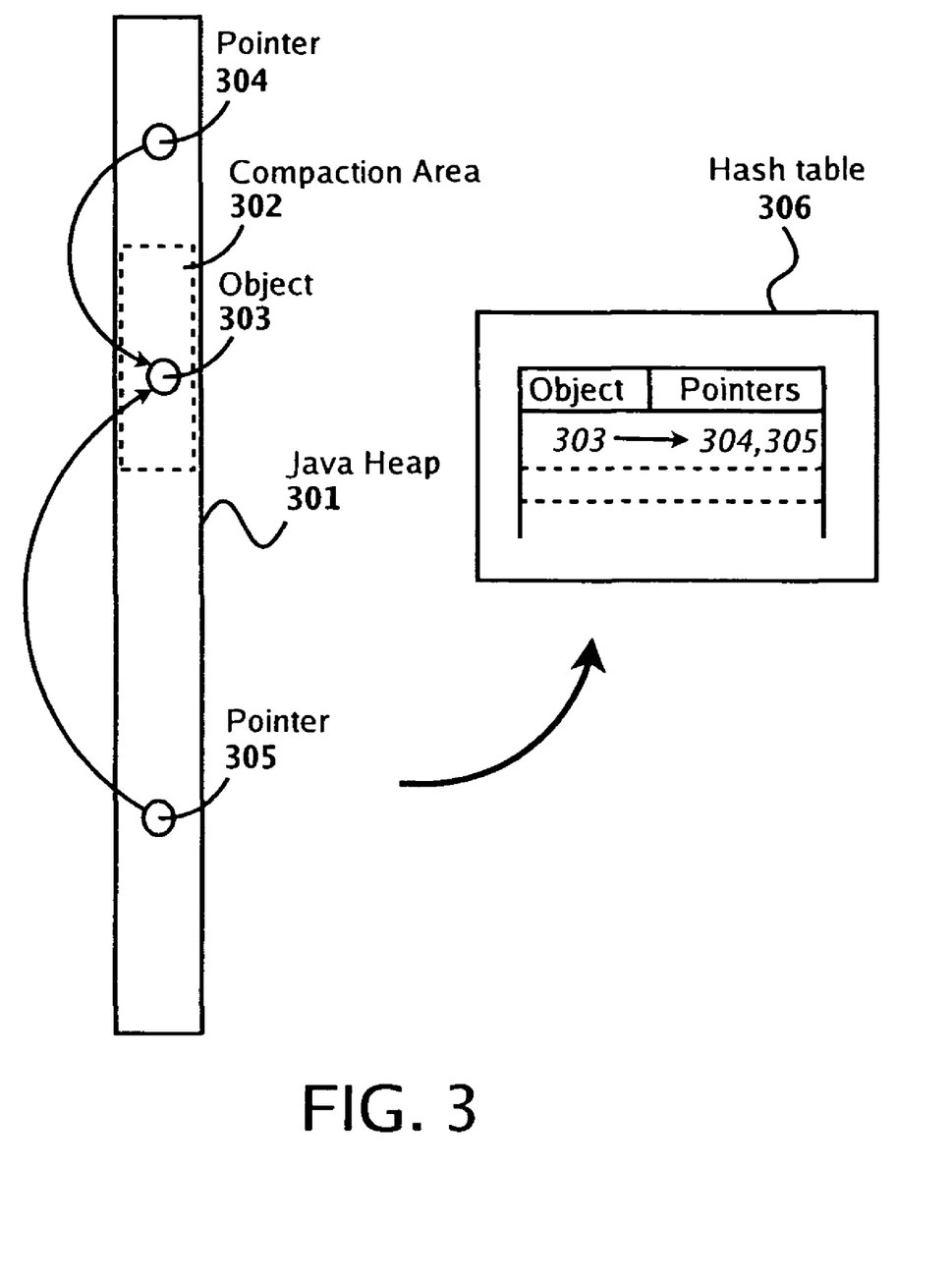
FIG. 3 shows a schematic of the data structures in accordance with an embodiment of the present invention, that tracks the compaction area within the heap in such a way that it is possible to abort the compaction half-way and to not move objects with many referrers.

FIG. 3 shows a schematic of the data structures in accordance with an embodiment of the invention, that can be used to track the compaction area within the heap in such a way that it is possible to control the time available to garbage collection and/or compaction, and, when necessary, to efficiently abort the compaction half-way and to not move those objects with many referrers. As shown in FIG. 3, the Java-heap 301 contains a selected compaction area 302. During the concurrent marking phase, those pointers 304, 305 who point to objects 303 within the selected compaction area 302 are detected. In an embodiment, the pointers thus detected (i.e. the referrers) are stored within a hash table, a list, or a similar data structure 306, with an index or key representing the address of the object (303), and the values representing the locations of the pointers to this object (304, 305). The system can then make use of this hash table structure in the following ways:

If, during compaction, the time limit for pause time is reached, it is possible to efficiently abort the compaction half-way. As described above, when using a traditional original pointer location set it is necessary to scan the full pointer location set, even if the compaction was aborted, because it was not known which pointer locations needed updating. However, in accordance with an embodiment of the present invention, the garbage collector can quickly find the pointer locations only for those objects that were actually moved;

In another usage, if the number of pointer locations that point to an object is above a threshold, then the object is not moved because it would take too long to update all the pointer locations that point to it.

In accordance with an embodiment, during the compaction phase a list of the pointer locations is sorted on the address pointed to in increasing order. Since the compaction is then performed with objects on addresses in increasing order (i.e. the objects are moved down in memory), the corresponding pointer location is tracked by a single pointer which moves through the sorted list of pointer locations.

Figure 4:
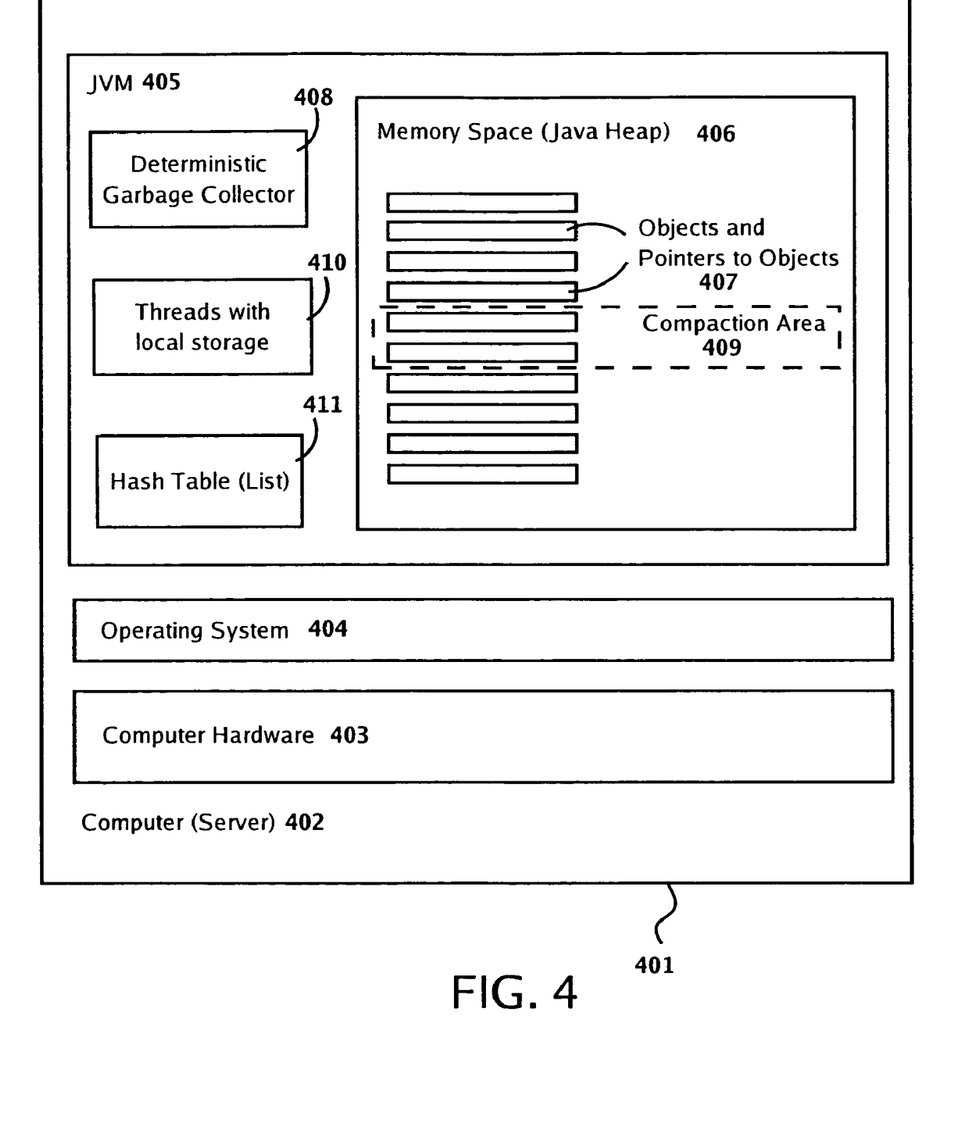
FIG. 4 shows an illustration of a system in accordance with an embodiment of the present invention, that includes a deterministic garbage collector.

FIG. 4 shows an illustration of a system in accordance with an embodiment of the present invention, that includes a deterministic garbage collector which controls the garbage collection process. As shown in FIG. 4, the system 401 may include a computer or physical server 402, that includes a hardware 403, operating system 404, and run-time environment or virtual machine 405. The virtual machine may be a Java Virtual Machine (JVM), examples of which include the Sun Microsystems Inc. Java Virtual Machine, and the JRockit product from BEA Systems, Inc. The JVM includes, or has access to, a memory space 406, which in a Java environment comprises the Java-heap. The Java-heap in turn contains the objects and pointers 407 for the application being executed. In accordance with an embodiment of the invention, a deterministic garbage collector 408 (or a deterministic garbage collection process), successively analyzes portions of the Java-heap referred to as the compaction area 409. In accordance with an embodiment, the system also calculates thread local variables 410 for each worker thread. The thread local variables count how many times pointers are updated by the worker thread. Current information about the compaction area is stored in a hash table 411, a list, or a similar data structure, for use by the garbage collector during the garbage collection process.

Figure 5:
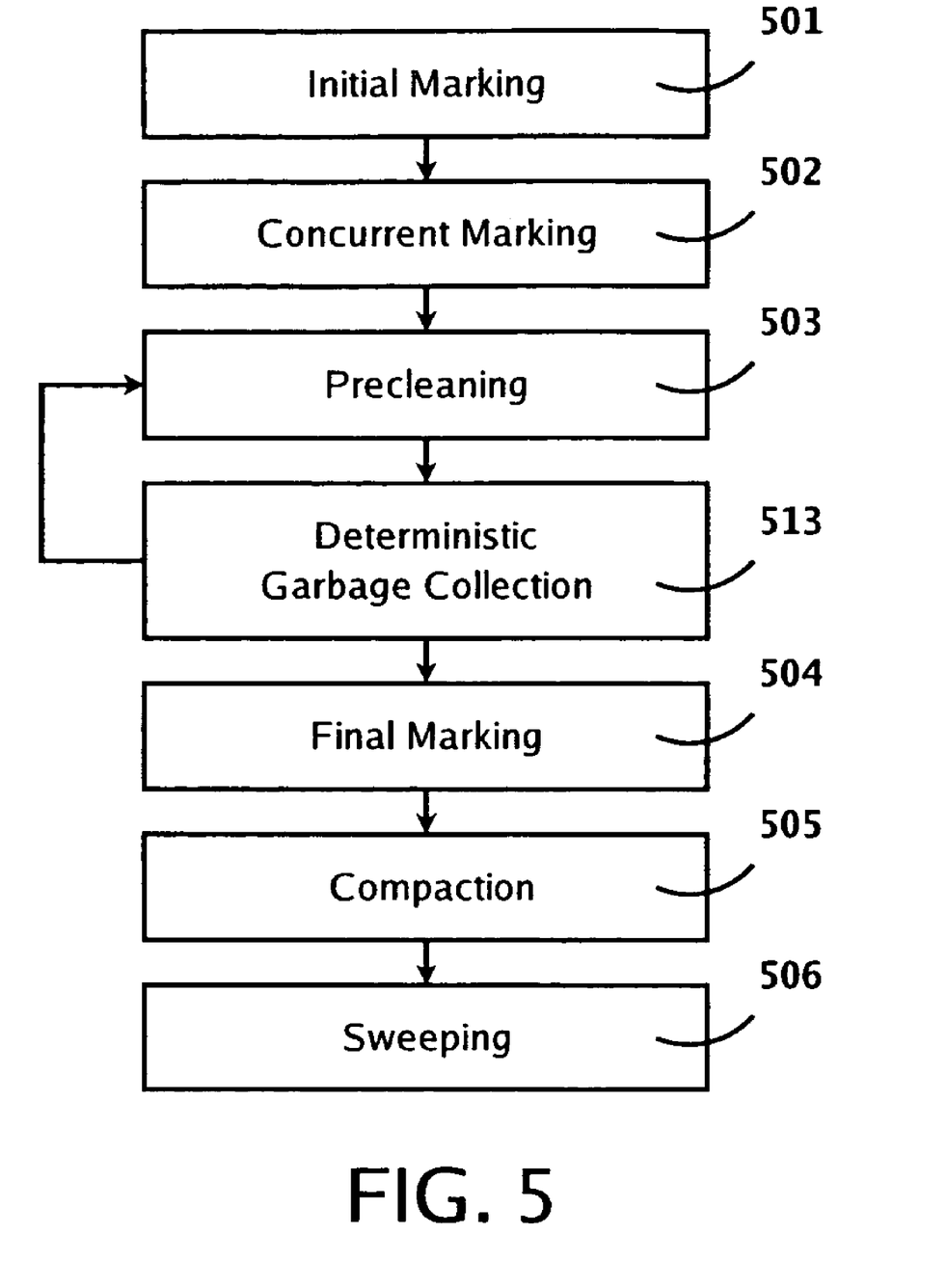
FIG. 5 shows a flowchart in accordance with an embodiment of the present invention that illustrates the process used by a non-generational concurrent garbage collector with shorter and more predictable pause times.

FIG. 5 shows a flowchart in accordance with an embodiment of the present invention that illustrates how the above techniques result in a non-generational concurrent garbage collector with shorter and more predictable pause times. In accordance with this embodiment, the sum of the pause times during the garbage collection must, within a set degree of probability, be lower than the target pause time limit. As shown in FIG. 5, in step 501, during an initial marking phase, the system performs an initialization largely similar to step 201 described above. In accordance with an embodiment, the system also calculates a thread local variable for each worker thread. In step 502, the concurrent marking phase proceeds largely similarly to step 202 described above. In accordance with an embodiment, the system also scans all live objects from the object roots. Additionally, when a pointer is updated by a worker thread, the worker thread local variable that counts the number of updates, is increased by a value of one.

In accordance with an embodiment of the present invention, the system can make use of several processors to perform the concurrent marking phase. Apart from dedicated concurrent marking threads, this implementation forces worker threads to do some concurrent marking. When a worker thread requests a new thread local area (TLA) on the Java-heap, the worker thread is forced to perform some concurrent marking before returning to normal work.

In step 503, the precleaning phase proceeds largely similarly to step 203 described above. Additionally, in accordance with an embodiment, the worker thread counters are set to a value zero, incurring a brief pause for the worker threads.

After the precleaning phase, the process includes an additional deterministic garbage collection step 513, which is also described in further detail below with respect to FIG. 6. In accordance with an embodiment, during the deterministic garbage collection step, the system sets the compaction time to a fractional value of the target pause time, thereby ensuring that this phase of the garbage collection process always lies below the target pause time. The estimation of the final marking time is based on statistics. Depending on the estimated final marking time the decision is taken to repeat, or not repeat, the precleaning.

In accordance with one embodiment, the worker thread counters are summed while the worker threads are running. This sum will be equal to or greater than the total number of dirty cards, since several updates can dirty a single card.

As a result of the deterministic garbage collection, in step 504, the final marking phase is only attempted when there are few enough dirty cards that the final marking pause time plus the other pause times will lie below the target pause time limit.

It is possible that, despite the above precautions, due to occasional variations in the Java-heap structure it is not possible to delay the final marking with another precleaning. This can happen if, for example, the JVM runs out of Java-heap space and the garbage collection needs to be completed for the JVM to continue running. If this happens, then the pause time would exceed the target pause time limit. However, the above process ensures that the pause time is more likely not to exceed the target pause time limit.

In step 505, compaction is performed using the information stored in hash table or structure 306.

In step 506, sweeping is then performed largely similarly to step 206 described above.

Deterministic Garbage Collection Details

Figure 6:
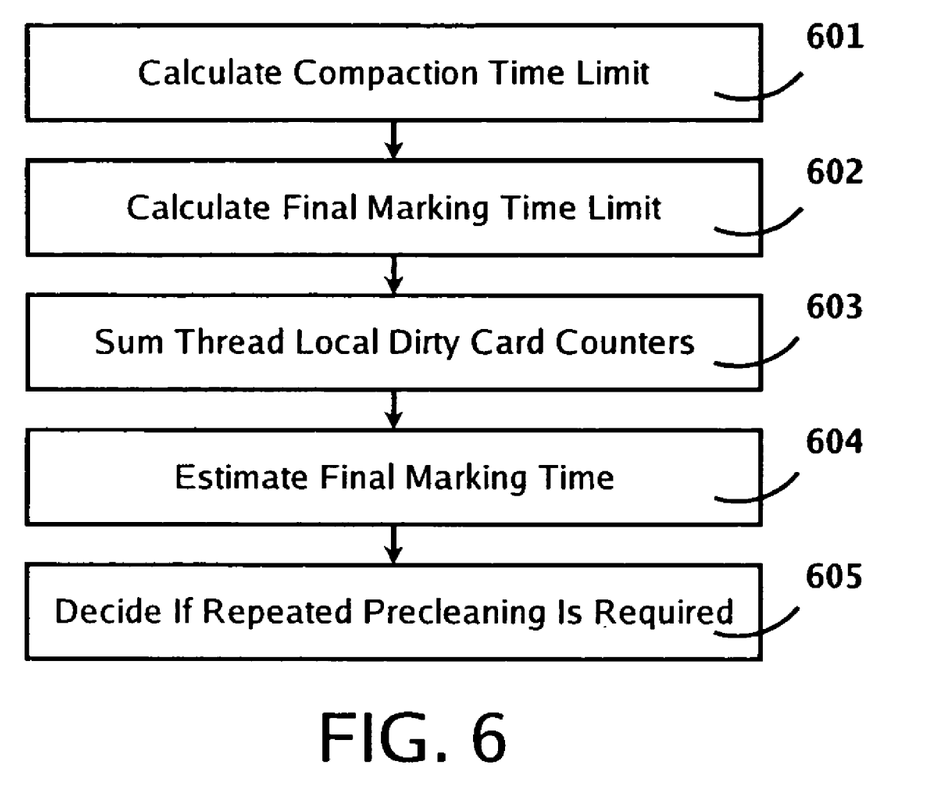
FIG. 6 shows a flowchart in accordance with an embodiment of the present invention that illustrates the decision process for how many times precleaning should be repeated.

FIG. 6 shows in more detail the steps of a deterministic garbage collection process in accordance with an embodiment of the invention. In particular, FIG. 6 shows the process by which the system determines how many times precleaning should be repeated. In accordance with one embodiment, the series of steps described in FIG. 6 takes place while the worker threads are running.

To consider a real-world example, given a target pause time of 30 ms, the system might allocate one third of the target pause time, 10 ms, to the compaction phase, step 601. The compaction phase is the most flexible phase of the garbage collection process since it is only needed for long term stability of the system. It is possible to temporarily shorten the time spent on compaction as long as enough time is spent on compaction over the longer perspective. Embodiments of the present invention take advantage of this flexibility by setting the compaction time to a fractional value of the target pause time, thereby ensuring that this part of the garbage collection process always lies below the target pause time. The remaining time is allocated for initial marking and final marking. The initial marking has already taken place and that time is subtracted. The remaining time (for example, approximately 17 ms), is available for the final marking, step 602.

In step 603, the worker thread counters are summed while the worker threads are running. This sum will be equal to or greater than the total number of dirty cards since several updates can dirty a single card. Locking is not required, since the garbage collector is only interested in the approximate value of the sum.

In step 604, an estimation of the final marking time is determined, based on statistics. Experiments have shown that, with a high degree of probability, cleaning any dirty card for a Java-heap takes a constant amount of time. For example, it takes approximately 1 μs on a system with 1 Gb of Java-heap and a 1 GHz Intel Pentium processor and 30% of live data. Embodiments of the present invention make use of the sum of the worker thread counters to estimate how long a period of time the final marking will take, by multiplying the sum with the estimated cleaning time for a dirty card. If, in step 604, the estimated final marking time exceeds the time calculated in step 602, then the decision is taken in step 605 to repeat the precleaning. If the final marking will lie below the allocated final marking time 602, then the decision is taken to proceed with the final marking.

Figure 7:
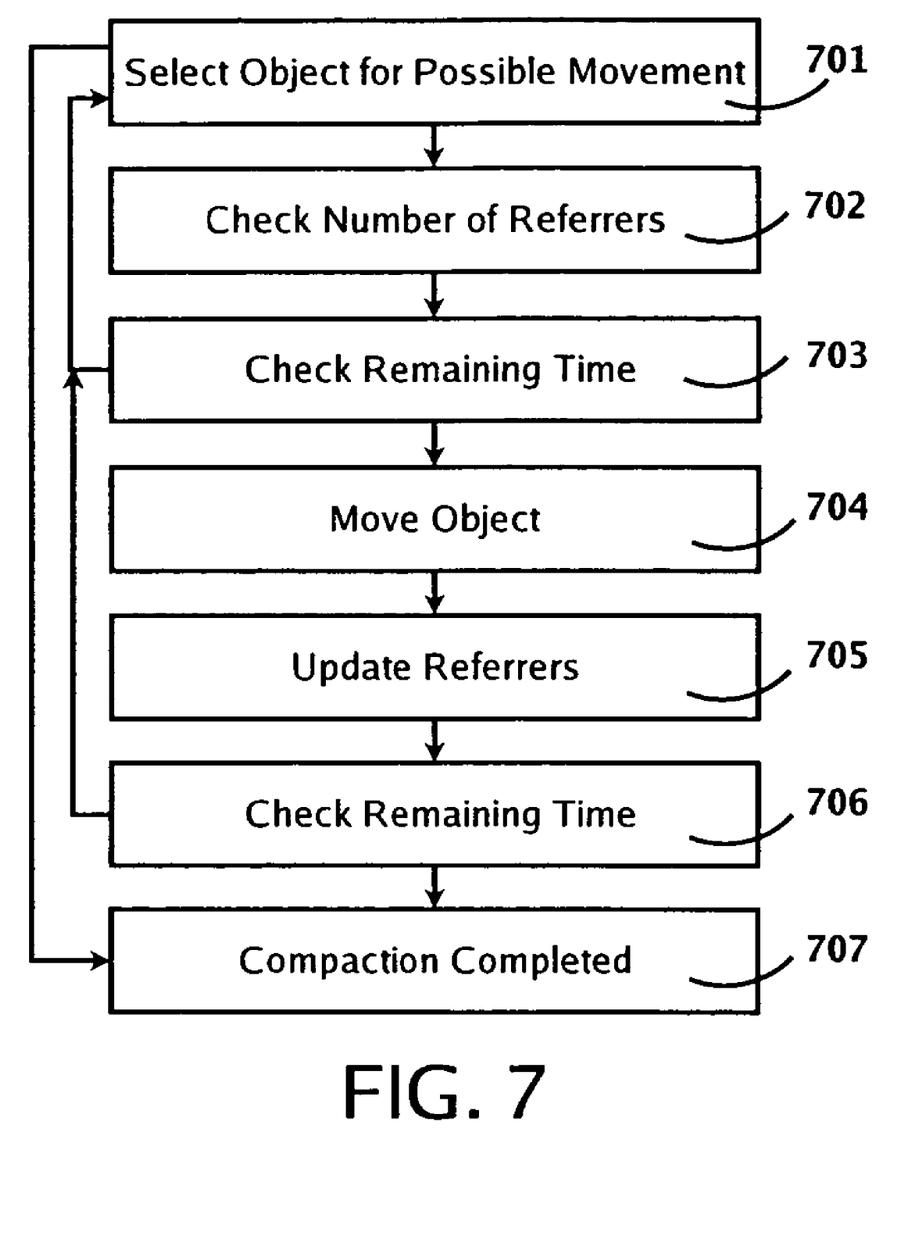
FIG. 7 show a flowchart in accordance with an embodiment of the invention that illustrates the decision process used to keep the compaction time within the calculated time limit.

FIG. 7 shows in more detail a process for keeping the compaction time within the calculated time limit in accordance with an embodiment of the invention. As shown in FIG. 7, in step 701, an object is selected for possible movement. If there are no more objects to be moved the compaction is completed (also step 707). In step 702, by using the hash table or structure 306 the system can determine how many referrers must be updated if the selected object is moved. In step 703, a check is made to see if the time it would take to update the referrers lies below the remaining time allocated for compaction. The object can then be moved, or else another object is selected. In step 704, the system either moves the object down within the selected compaction area or evacuates it out of the selected compaction area to the bottom of the Java-heap. If there are few objects found within the compaction area then the objects are evacuated to leave a completely empty area behind. Otherwise they are moved within the compaction area. In step 705, the referrers to the moved object are then updated, again using the structure 306. If, in step 706 the remaining time is checked and it allows for more objects to be moved, then the process returns to repeat step 701. Otherwise, in step 707, the compaction process is completed.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, while the embodiments of the systems and methods described above are described in the context of a JRockit environment, it will be evident that the system and methods may be used with other types of application servers, virtual machines, and Java Virtual Machines. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for deterministic garbage collection in a virtual machine environment, comprising:
   a computer, including a computer readable medium and processor operating thereon;
   a virtual machine, executing on the computer, for executing a software application;
   a memory space for use by the virtual machine in storing software objects and pointers as part of the software application;
   a plurality of worker threads that each update pointers within the memory space at runtime;
   a data structure including a plurality of elements, wherein each element is associated with a different region of the memory space, and wherein when a pointer is updated in a particular region of the memory space the element associated with the particular region is modified to indicate that the particular region of the memory space requires cleaning;

a plurality of worker thread counters, wherein each worker thread counter is a thread local variable associated with one of the plurality of worker threads and wherein each time one of the worker threads updates any pointer, the corresponding worker thread counter increments such that it indicates the number of times the corresponding worker thread has updated pointers;

a counter sum associated with the plurality of worker threads, wherein the counter sum is calculated by summing the plurality of worker thread counters to indicate a total number of times the plurality of worker threads have updated pointers, which provides an estimate of a maximum number of regions of the memory space that require cleaning; and a garbage collector that
determines a target pause time limit for garbage collection,
performs an initial marking phase of garbage collection,
allocates a fractional amount of the target pause time limit for a compaction phase of garbage collection;
determines an estimated pause time based on the maximum number of regions of the memory space that require cleaning, as estimated by the counter sum,
determines a calculated time limit for garbage collection of the software objects within a compaction area which corresponds to the target pause time limit less a time taken to perform the initial marking phase and the fractional amount of the target pause time limit, and
controls the garbage collection process so that a final marking phase is performed only when the estimated pause time is less than the calculated time limit.

2. The system of claim 1, wherein the garbage collector determines the estimated pause time based on statistics.

3. The system of claim 2, wherein the garbage collector controls the garbage collection process so that the estimated pause time for garbage collection will be lower than the target pause time limit, within a degree of statistical probability.

4. The system of claim 2, wherein the statistical estimate of the pause time limit is based on information encoded into the system prior to running the software application.

5. The system of claim 2, wherein the statistical estimate of the pause time limit is based on run-time information collected by the system while the software application is running.

6. The system of claim 1, wherein during a marking step, any pointers that point to software objects within the compaction area are determined, and the pointers thus determined are stored in a table, with a key representing the address of the software object pointed to, and a value representing the locations of the pointers to the software object.

7. The system of claim 6 wherein:
a software object within the compaction area is selected and a number of pointers associated with the selected software object is determined using the table;
a time required to update the number of pointers is estimated; and
if the time required to update the number of pointers is less than the target pause time limit, then the software object is moved and the number of pointers is updated using the table.

8. The system of claim 1, wherein each thread local variable is an indication of the number of dirty cards that must be processed by the garbage collector during the next garbage collection.

9. The system of claim 1, wherein the garbage collector selectively repeats a precleaning step for the software objects, wherein during the precleaning step, the garbage collector calculates the thread local variable for each worker thread that indicates how many times pointers are updated by the worker thread.

10. The system of claim 9, wherein the sum of the pause times is based on a statistical estimate of a final marking time, and wherein, depending on the estimate for the final marking time the decision is made by the garbage collector to repeat, or not repeat, the precleaning step.

11. The system of claim 1 further comprising:
wherein, during a concurrent marking step, pointers which point to objects in the compaction area are detected and stored in a data structure including an index representing an address for each object and a value representing a location of each pointer which points to each object; and
wherein, during a compaction step, if the target pause time limit for compaction is reached, the compaction is aborted and can be later resumed from the point at which it was aborted using the data structure.

12. The system of claim 1, wherein, during a compaction step, if the number of pointer locations that point to a software object is above a threshold value, then the software object is not moved as part of the compaction step.

13. The system of claim 1 wherein when a worker thread requests a new thread local area (TLA) within the memory space, that worker thread is forced to perform concurrent marking before returning to normal work.

14. A method for deterministic garbage collection in a virtual machine environment, comprising the steps of:
providing a virtual machine for executing a software application;
providing a memory space for use by the virtual machine in storing software objects and pointers as part of the software application;
using a plurality of worker threads that each update pointers within the memory space at runtime;
providing a data structure including a plurality of elements, wherein each element is associated with a different region of the memory space, and wherein when a pointer is updated in a particular region of the memory space the element associated with the particular region is modified to indicate that the particular region of the memory space requires cleaning;
using a plurality of worker thread counters, wherein each worker thread counter is a thread local variable associated with one of the plurality of worker threads and wherein each time one of the worker threads updates any pointer, the corresponding worker thread counter increments such that it indicates the number of times the corresponding worker thread has updated pointers;
using a counter sum associated with the plurality of worker threads, wherein the counter sum is calculated by summing the plurality of worker thread counters to indicate total number of times the plurality of worker threads have updated pointers, which provides an estimate of a maximum number of regions of the memory space that require cleaning; and
using a garbage collector that
determines a target pause time limit for garbage collection;
performs an initial marking phase of garbage collection;

allocates a fractional amount of the target pause time limit for a compaction phase of garbage collection;

determines an estimated pause time based on the maximum number of regions of the memory space that require cleaning, as estimated by the counter sum, determines a calculated time limit for garbage collection of the software objects within a compaction area which corresponds to the target pause time limit less a time taken to perform the initial marking phase and the fractional amount of the target pause time limit, and controls the garbage collection process so that a final marking phase is performed only when the estimated pause time is less than the calculated time limit.

15. The method of claim 14, wherein the garbage collector determines the estimated pause time based on statistics.

16. The method of claim 15, wherein the garbage collector controls the garbage collection process so that the estimated pause time for garbage collection will be lower than the target pause time limit, within a degree of statistical probability.

17. The method of claim 15, wherein the statistical estimate of the pause time limit is based on information encoded into the system prior to running the software application.

18. The method of claim 15, wherein the statistical estimate of the pause time limit is based on run-time information collected by the system while the software application is running.

19. The method of claim 14, wherein during a marking step, any pointers that point to software objects within the compaction area are determined, and the pointers thus determined are stored in a table, with a key representing the address of the software object pointed to, and a value representing the locations of the pointers to the software object.

20. The method of claim 19 wherein:
a software object within the compaction area is selected and a number of pointers associated with the selected software object is determined using the table;
a time required to update the number of pointers is estimated; and
if the time required to update the number of pointers is less than the target pause time limit, then the software object is moved and the number of pointers is updated using the table.

21. The method of claim 14 wherein each thread local variable is an indication of the number of dirty cards that must be processed by the garbage collector during the next garbage collection.

22. The method of claim 14, wherein the garbage collector selectively repeats a precleaning step for the software objects, wherein during the precleaning step, the garbage collector calculates the thread local variable for each worker thread that indicates how many times pointers are updated by the worker thread.

23. The method of claim 22, wherein the sum of the pause times is based on a statistical estimate of a final marking time, and wherein, depending on the estimate for the final marking time the decision is made by the garbage collector to repeat, or not repeat, the precleaning step.

24. The method of claim 14 further comprising:
wherein, during a concurrent marking step, pointers which point to objects in the compaction area are detected and stored in a data structure including an index representing an address for each object and a value representing a location of each pointer which points to each object; and
wherein, during a compaction step, if the target pause time limit for compaction is reached, the compaction is aborted and can be later resumed from the point at which it was aborted using the data structure.

25. The method of claim 14, wherein, during a compaction step, if the number of pointer locations that point to a software object is above a threshold value, then the software object is not moved as part of the compaction step.

26. The method of claim 14 wherein when a worker thread requests a new thread local area (TLA) within the memory space, that worker thread is forced to perform concurrent marking before returning to normal work.

27. A computer readable medium including instructions stored thereon which when executed cause the computer to perform the steps of
providing a virtual machine for executing a software application;
providing a memory space for use by the virtual machine in storing software objects and pointers as part of the software application;
using a plurality of worker threads that each update pointers within the memory space at runtime;
providing a data structure including a plurality of elements, wherein each element is associated with a different region of the memory space, and wherein when a pointer is updated in a particular region of the memory space the element associated with the particular region is modified to indicate that the particular region of the memory space requires cleaning;
using a plurality of worker thread counters, wherein each worker thread counter is a thread local variable associated with one of the plurality of worker threads and wherein each time one of the worker threads updates any pointer, the corresponding worker thread counter increments such that it indicates the number of times the corresponding worker thread has updated pointers;
using a counter sum associated with the plurality of worker threads, wherein the counter sum is calculated by summing the plurality of worker thread counters to indicate a total number of times the plurality of worker threads have updated pointers, which provides an estimate of a maximum number of regions of the memory space that require cleaning; and
using a garbage collector that
determines a target pause time limit for garbage collection;
performs an initial marking phase of garbage collection;
allocates a fractional amount of the target pause time limit for a compaction phase of garbage collection;
determines an estimated pause time, based on the maximum number of regions of the memory space that require cleaning, as estimated by the counter sum,
determines a calculated time limit for garbage collection of the software objects within a compaction area which corresponds to the target pause time limit less a time taken to perform the initial marking phase and the fractional amount of the target pause time limit, and
controls the garbage collection process so that a final marking phase is performed only when the estimated pause time is less than the calculated time limit.

28. The computer readable medium of claim 27 wherein:
during a marking step, any pointers that point to software objects within the compaction area are determined, and the pointers thus determined are stored in a table, with a key representing the address of the software object pointed to, and a value representing the locations of the pointers to the software object;

a software object within the compaction area is selected and a number of pointers associated with the selected software object is determined using the table;

a time required to update the number of pointers is estimated; and if the time required to update the number of pointers is less than the target pause time limit, then the software object is moved and the number of pointers is updated using the table.

29. The computer readable medium of claim 27 wherein when a worker thread requests a new thread local area (TLA) within the memory space, that worker thread is forced to perform concurrent marking before returning to normal work.

* * * * *

UNITED STATES PATENT AND TRADEMARK OFFICE
CERTIFICATE OF CORRECTION

| | | |
|---|---|---|
| PATENT NO. | : 7,953,773 B2 | Page 1 of 1 |
| APPLICATION NO. | : 11/182137 | |
| DATED | : May 31, 2011 | |
| INVENTOR(S) | : Lindholm et al. | |

It is certified that error appears in the above-identified patent and that said Letters Patent is hereby corrected as shown below:

On Title page, under "Other Publications", line 1, delete "Multt-threaded" and insert -- Multi-threaded --, therefor.

In column 10, line 59, in Claim 14, after "indicate" insert -- a --.

In column 12, line 14, in Claim 27, after "steps of" insert -- : --.

Signed and Sealed this
Twenty-fifth Day of October, 2011

David J. Kappos
*Director of the United States Patent and Trademark Office*